US011100600B2

(12) United States Patent
Shaw et al.

(10) Patent No.: US 11,100,600 B2
(45) Date of Patent: Aug. 24, 2021

(54) SYSTEMS AND METHODS FOR ENTITY NETWORK ANALYTICS USING GEOMETRIC GROWTH RATE ANALYSIS

(71) Applicant: LEXISNEXIS RISK SOLUTIONS INC., Alpharetta, GA (US)

(72) Inventors: Jesse C P B Shaw, Leland, NC (US); Jeffrey Allen Feinstein, Roswell, GA (US); Eric Graves, Saint Paul, MN (US)

(73) Assignee: LEXISNEXIS RISK SOLUTIONS INC., Alpharetta, GA (US)

( * ) Notice: Subject to any disclaimer, the term of this patent is extended or adjusted under 35 U.S.C. 154(b) by 497 days.

(21) Appl. No.: 16/033,692

(22) Filed: Jul. 12, 2018

(65) Prior Publication Data
US 2020/0020062 A1 Jan. 16, 2020

(51) Int. Cl.
*G06Q 50/26* (2012.01)
*G06F 16/28* (2019.01)
(Continued)

(52) U.S. Cl.
CPC ........ *G06Q 50/265* (2013.01); *G06F 16/288* (2019.01); *G06F 16/9024* (2019.01);
(Continued)

(58) Field of Classification Search
CPC ... G06Q 50/265; G06F 16/288; G06F 16/951; G06F 16/9024; G06F 21/60; H04L 63/102; H04L 63/308
See application file for complete search history.

(56) References Cited

U.S. PATENT DOCUMENTS 8,918,891 B2 12/2014 Coggeshall et al.
9,703,986 B1 7/2017 Ashley et al.
(Continued)

OTHER PUBLICATIONS

Letizia Milli et al., "Quantification in Social Networks", IEEE International Conference on Data Science and Advanced Analytics (DSAA), Oct. 2015 (Year: 2015).*

(Continued)

*Primary Examiner* — Mehmet Yesildag
*Assistant Examiner* — Joshua D Schneider
(74) *Attorney, Agent, or Firm* — Troutman Pepper Hamilton Sanders LLP; James E. Schutz; Mark Lehi Jones

(57) ABSTRACT

The disclosed technology includes systems and methods for identifying synthetic identities among a population of entity representations in an electronic database. The method includes include selecting a first entity representation, and for the selected first entity representation, identifying one or more network chains formed by one or more connections between the first entity representation, a second entity representation, and zero or more intervening entity representations; and determining a number of connections per connection degree for a predetermined number of degrees in at least one of the identified one or more network chains; determining, based on the number of connections per connection degree, an indication that one or more of the first entity representation, the second entity representation, and zero or more of the intervening entity representations is a synthetic identity; and outputting entity representation information of one or more entities in the population that are indicated as a synthetic identity.

20 Claims, 8 Drawing Sheets

(51) Int. Cl.
  *G06F 21/60*     (2013.01)
  *G06F 16/951*    (2019.01)
  *G06F 16/901*    (2019.01)
  *H04L 29/06*     (2006.01)
(52) U.S. Cl.
  CPC ........... *G06F 16/951* (2019.01); *G06F 21/60* (2013.01); *H04L 63/102* (2013.01); *H04L 63/308* (2013.01)

(56) References Cited

U.S. PATENT DOCUMENTS

| | | | | |
|---|---|---|---|---|
| 9,967,265 | B1* | 5/2018 | Peer | H04L 63/20 |
| 2014/0046983 | A1* | 2/2014 | Galloway | G06F 16/29 |
| | | | | 707/798 |
| 2014/0358811 | A1* | 12/2014 | Cama | G06Q 10/00 |
| | | | | 705/325 |
| 2015/0049634 | A1* | 2/2015 | Levchuk | G06Q 50/01 |
| | | | | 370/254 |
| 2015/0138973 | A1* | 5/2015 | Kumar | H04L 45/12 |
| | | | | 370/235 |
| 2016/0086262 | A1 | 3/2016 | Straub et al. | |
| 2016/0110476 | A1* | 4/2016 | Shinkuma | G06F 16/9024 |
| | | | | 707/741 |
| 2017/0091193 | A1* | 3/2017 | Li | G06Q 50/01 |
| 2018/0114017 | A1 | 4/2018 | Leitner et al. | |
| 2018/0130140 | A1* | 5/2018 | Xu | H04L 29/08 |
| 2018/0309791 | A1* | 10/2018 | Johnson | H04L 41/28 |
| 2018/0349993 | A1* | 12/2018 | Straub | G06Q 50/265 |

OTHER PUBLICATIONS

Mauro Conti et al., "FakeBook: Detecting Fake Profiles in On-line Social Networks", IEEE/ACM International Conference on Advances in Social Networks Analysis and Mining, Aug. 1012 (Year: 2012).*
Alan Mislove et al., "Measurement and analysis of online social networks", Oct. 2007, IMC '07: Proceedings of the 7th ACM SIGCOMM conference on Internet measurement, pp. 29-42 (Year: 2007).*
Extended European Search Report issued in European Application No. 19185698 filed Jul. 11, 2019.

* cited by examiner

SYSTEMS AND METHODS FOR ENTITY NETWORK ANALYTICS USING GEOMETRIC GROWTH RATE ANALYSIS

TECHNICAL FIELD

The embodiments described herein relate to systems and methods for identifying fraudulent or synthetic identities based on associated entity network growth rates.

BACKGROUND

Many businesses and/or governmental agencies face an increasing number of issues associated with misrepresented identities. Identity fraud based on stolen or manipulated identity information can very difficult to detect. Verifying an identity of a person, for example, can involve obtaining information from independent sources (such as credit bureaus, public records, etc.) and corroborating such information with data provided by the person. For example, when a person applies to open an account with a business, the business can utilize an identity verification service to check the person's credentials against public and private databases to verify the person's identity. In certain instances, the applicant's name and other identity information can be checked against available fraud databases to learn of any past fraudulent activity by the applicant.

Fraudsters are now generating "synthetic identities," which may appear to be legitimate, but are difficult to verify. Since the identity is not real, there may be no reported history or fraudulent activity associated with that synthetic identity. It is likely that deception schemes involving synthetic identities will continue to increase, particularly if detection and prevention mechanisms are not in place. Thus, there is a need for effective ways to detect if an identity is synthetic.

BRIEF SUMMARY

Some or all of the above needs may be addressed by certain embodiments of the disclosed technology.

According to an example embodiment of the disclosed technology, a computer-implemented method performed by at least one processor configured to access an electronic database is provided for identifying one or more synthetic identities among a population of entity representations in the electronic database. Each entity representation in the electronic database can include a plurality of records, each record can include a plurality of fields, at least a first field of the plurality of fields is capable of indicating a connection to a cohort entity representation in the population. The method can include selecting, from the population of entity representations, a first entity representation, and for the selected first entity representation, the method includes identifying one or more network chains formed by one or more connections between the first entity representation, a second entity representation, and zero or more intervening entity representations; and determining a number of connections per connection degree for a predetermined number of degrees in at least one of the identified one or more network chains. The method includes determining, based on the number of connections per connection degree, an indication that one or more of the first entity representation, the second entity representation, and zero or more of the intervening entity representations is a synthetic identity; and outputting entity representation information of one or more entities in the population that are indicated as a synthetic identity.

In an example implementation, a system is provided. The system includes least one memory for storing data and computer-executable instructions, and at least one processor configured to access the at least one memory and further configured to execute the computer-executable instructions to identify one or more synthetic identities among a population of entity representations in an electronic database. Each entity representation in the electronic database may include a plurality of records, each record can include a plurality of fields, at least a first field of the plurality of fields capable of indicating a connection to a cohort entity representation in the population. The one or more synthetic identities are identified by a process of selecting, from the population of entity representations, a first entity representation, and for the selected first entity representation, the process includes identifying one or more network chains formed by one or more connections between the first entity representation, a second entity representation, and zero or more intervening entity representations; and determining a number of connections per connection degree for a predetermined number of degrees in at least one of the identified one or more network chains. The process includes determining, based on the number of connections per connection degree, an indication that one or more of the first entity representation, the second entity representation, and zero or more of the intervening entity representations is a synthetic identity; and outputting entity representation information of one or more entities in the population that are indicated as a synthetic identity.

These and other embodiments of the disclosed technology will be described in more detail below with reference to the figures.

DETAILED DESCRIPTION

Figure 1:
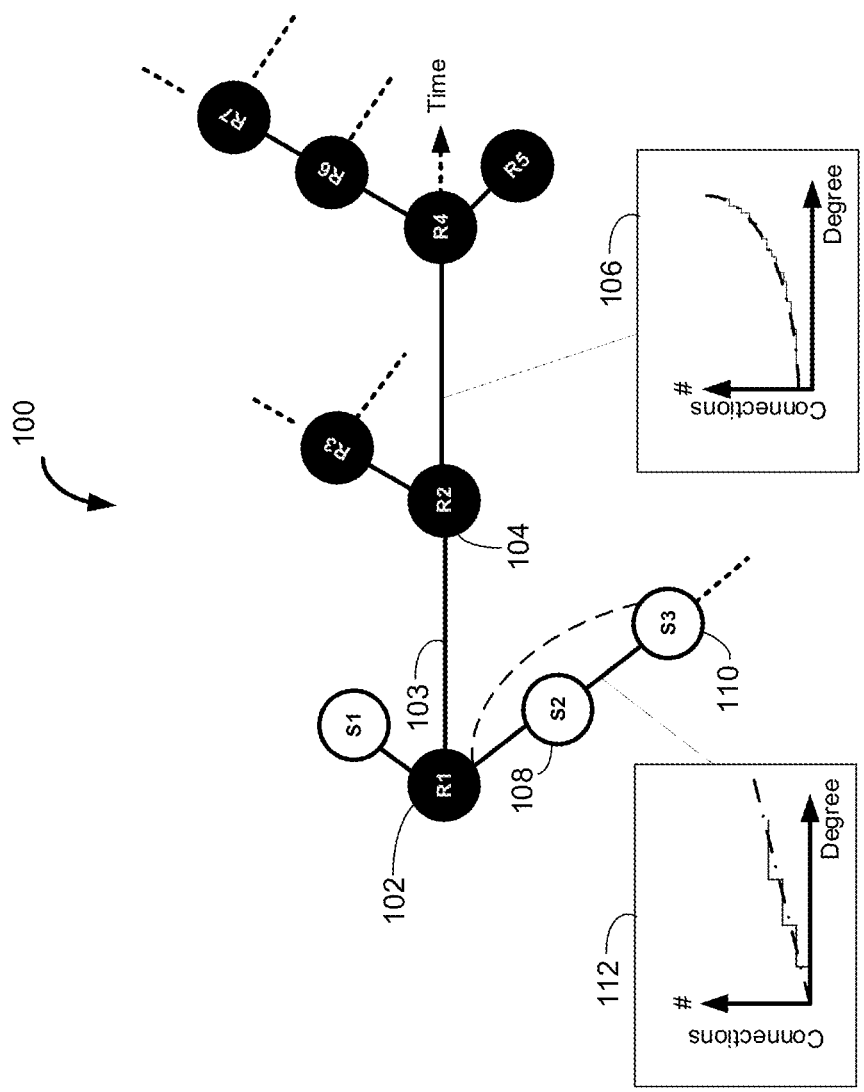
FIG. 1 illustrates an example entity network populated with real entities and synthetic identities, with associated illustrative network geometric growth by connection degree, according to an example implementation of the disclosed technology.

To facilitate an understanding of the principles and features of the disclosed technology, various illustrative embodiments are explained below. The systems and methods described hereinafter technology are intended to be illustrative and not restrictive. Many suitable end-use applications that could utilize the same or similar functions as described herein are intended to be embraced within the scope of the disclosed technology.

Briefly described, various embodiments of the disclosed technology may be utilized to identify synthetic identities in entity networks by determining associated geometric growth and/or growth rates of the entity networks by connection degree.

As used herein, the term "entity network" is intended to include system graph information that may be indicative of direct and/or indirect connections among the entities represented in the graph. Such information may be obtained or derived from public, private, and/or proprietary sources for determining the system graph information. Certain example implementations of the disclosed technology may emphasize public record information such as shared assets, cohabitation, and other records of similar type that are difficult to fabricate.

Information from certain social networking platforms, such as Facebook, Instagram, Twitter, etc., may be considered in certain implementations, but the information obtained from such platforms may be weighted according to the reliability of the information. In certain example implementations, the information from these social networking platforms may not be utilized at all.

As used herein, the terms "degree," "degrees of separation," "connection degree," or "$n^{th}$ degree" as applied to entity network connections can generally refer to a figurative "distance" between two entity representations. In terms of an entity graph of nodes, where each node represents an entity connected to another entity by an edge, a "first degree" relationship is defined herein as two nodes directly connected by an edge without an intervening node. Such first-degree connections may be defined by factors such as cohabitation, shared assets, member of the same family, and/or similar factors. As used herein, a "second degree" relationship can refer to an indirect relationship between two nodes or entities of an entity network where one or more intervening first-degree relationships provide the connections linking the two nodes or entities. In general, a relationship of "n degrees" can refer to a relationship between two nodes of an entity network graph where n−1 intervening first-degree relationships provide the connections linking the two nodes by n intervening edges.

In accordance with certain example implementations of the disclosed technology, relationship between two entities may be established by active and/or passive interactions. Active interactions typically involve real people in situations that may be difficult to fabricate. For example, connections based on active interactions can include real people who co-own assets, who share an insurance policy, who are co-named on a bankruptcy, etc. An example of a connection based on a passive interaction includes establishing a link between two entities through a record of cohabitation. In certain example implementations, connections based on such passive interactions may be established and/or considered after predetermined period, such as after 6 months of cohabitation.

Since synthetic entities are non-autonomous, they rely on actions performed by a real person to create the "appearance" of certain network connections to other entities. A fraudster cultivating non-autonomous identities, for example, may have many connections at the first degree, but lower than average connections at higher degrees due to the passive nature of the connections. In certain situations, the fraudster may easily create first-degree connections between synthetic entities, and only higher degree connections involving the synthetic entities are created through actions by the fraudster. Thus, in accordance with certain example implementations of the disclosed technology, synthetic entities may be detected by determining entities that have higher than normal connections at the first degree, but lower than normal connections in higher degrees.

FIG. 1 illustrates an example entity network 100 populated with synthetic identities S1-S3 (illustrated by the light nodes) and real entities R1-R7 (illustrated by the dark nodes), with associated connections 103 therebetween. FIG. 1 also includes an inset graph 106 illustrating the number of connections as a function of separation degree for certain network connections involving real entities. Insert graph 112 illustrates the number of connections as a function of separation degree for certain network connections involving synthetic identities, according to an example implementation of the disclosed technology.

As illustrated in the example entity network 100 of FIG. 1, a real entity 102 (denoted by R1) may generate synthetic identities S1-S3 sequentially over time. For example, a first synthetic identity S1 may be generated with a fake name, but with other identifying information (such as an address) that may indicate a connection between the synthetic identity S1 and the real entity R1. Slightly later in time, the real entity R1 may generate another synthetic identity 108 (denoted by S2), again with identifying information indicating a connection between the synthetic identity S2 and the real entity R1.

FIG. 1 also illustrates legitimate branches of the entity network 100 involving real entities. For example, a real entity R1 is shown connected to another real entity 104 (denoted by R2). For example, R2 may be a spouse or relative of R1 and these two real entities 102, 104 may be connected 103 by a cohabitation address. Subsequently, additional connections may be formed linking R2 and R3, R2 and R4, (and so on).

As illustrated by the inset graph 106, branches of an entity network populated by real entities may be characterized by a number of connections per degree that can be distinguished over a network associated with synthetic identities. For example, since synthetic identities are not representations of real people, once these synthetic identities are generated, their associated network connections do not typically expand like networks connected with real entities. However, in some situations, a real entity (such as a fraudster) could generate additional synthetic identities with connections that could appear to be of $2^{nd}$ degree or higher. FIG. 1 depicts such a scenario where a real entity R1 generates (as illustrated by the dashed curve) another synthetic identity 110 (denoted by S3) having identifying information tying S3 to S2. In practice however, it may be difficult to generate synthetic networks populated with synthetic identities, and having higher than first degree connections due to a lack of normal, autonomous connection activities that are characteristic of real humans. Furthermore, as illustrated by the inset graph 112, such synthetic networks may be characterized by linear geometric growth. Certain synthetic networks may be characterized by little or no growth, depending on the build-out and maintenance of such networks.

When a fraudster creates a synthetic identity, the synthetic identity typically just shows up in the network and relies on actions by the fraudster to connect it with others. As a result, certain networks populated with the second and higher-degree connections to a synthetic identity may include people who are also connected to the fraudster. Certain example implementations of the disclosed technology may use such information to determine the identity of a fraudster.

Certain example implementations of the disclosed technology may analyze entity network growth from different perspectives to corroborate the accuracy of the information. In certain example implementations, an entity can be evaluated by: (a) an age of the entity when they first emerged in a record; (b) how long the entity has been contributing to their entity network fingerprint; and (c) the current age of the entity. For example, one record associated with a particular entity representation may indicate an emergence age of 16, which may be consistent with a typical emergence age of minor who obtains a driving permit, and/or is employed for the first time. Other records associated with this entity representation may indicate that they have been contributing to their entity network record (i.e., fingerprint) for 20 years. Yet another record may indicate that this particular entity representation has a current age of 26 years old, but not 36 years old, as indicated by the emergence age and length of contributions to the record. Certain example implementations of the disclosed technology may utilize such multi-perspective analysis to scrub or flag records in which a conflict exists in the corroboration.

Figure 2A:
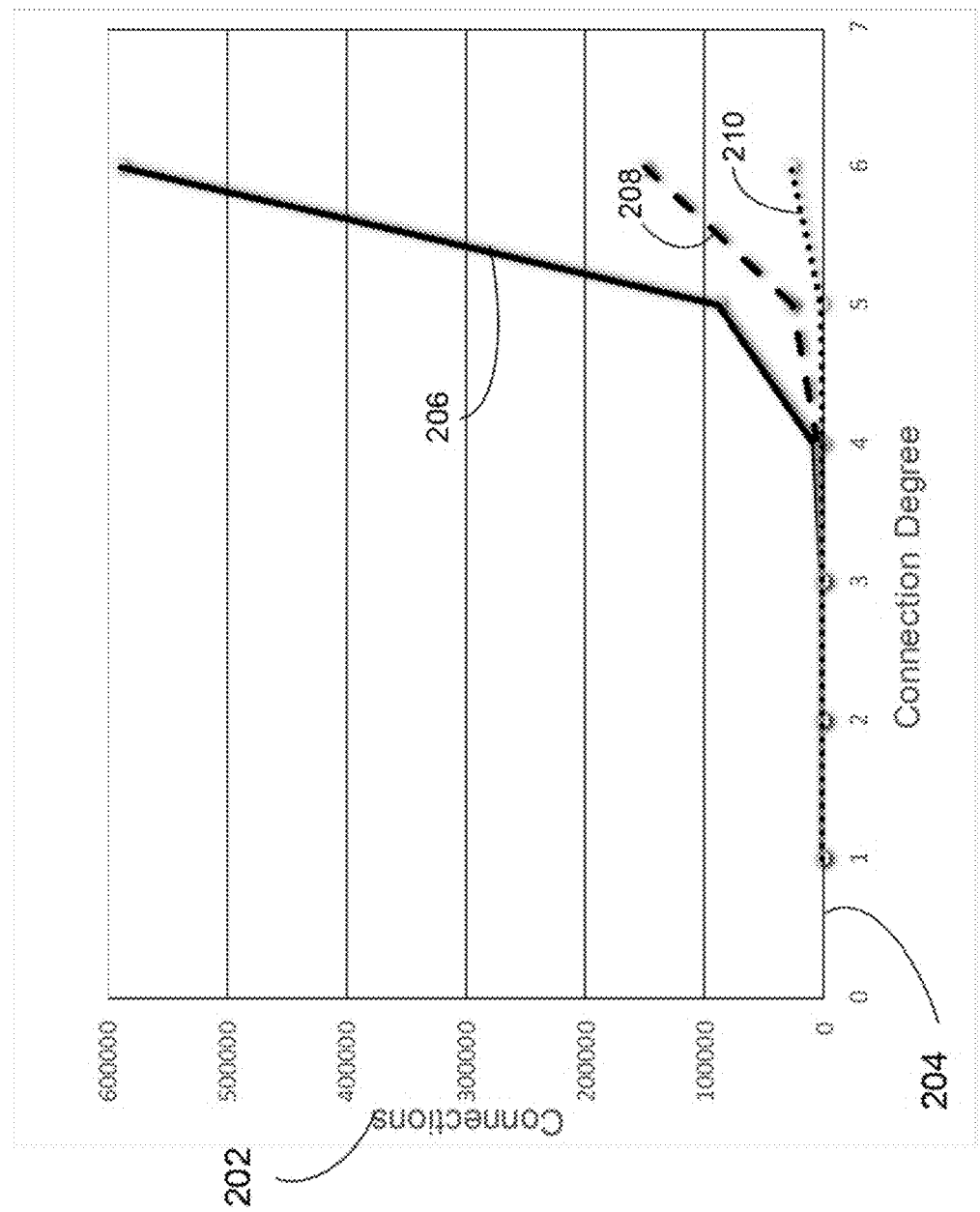
FIG. 2A illustrates the number of connections per connection degree for a natural person, a possible immigrant, and a synthetic identity.

FIG. 2A illustrates the number of entity network connections 202 as a function of connection degree 204 for a natural person 206, a possible immigrant 208, and a synthetic identity 210. In the case of the natural person 206, the number of connections 202 is typically substantially higher than those associated with a synthetic identity 210, particularly for those connections above $2^{nd}$ degree. Certain example implementations of the disclosed technology may also be able to distinguish between a possible immigrant 208 and a synthetic identity 210.

Figure 2B:
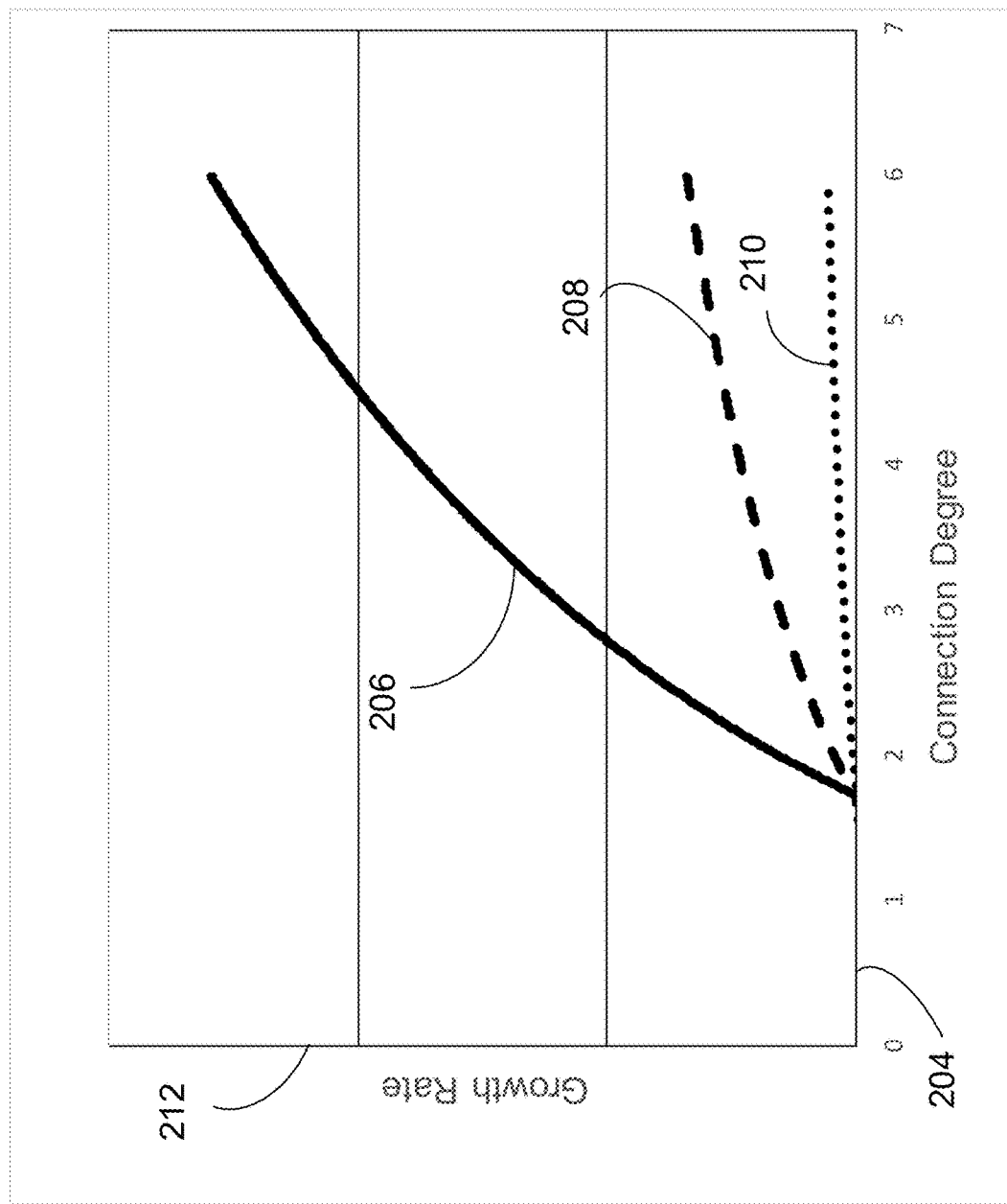
FIG. 2B illustrates the connection growth trends per connection degree for a natural person, a possible immigrant, and a synthetic identity, corresponding to the number of connections per degree as shown in FIG. 2A.

FIG. 2B illustrates connection growth 212 trends per connection degree 204 for a natural person 206, a possible immigrant 208, and a synthetic identity 210, corresponding to the number of connections per degree as shown in FIG. 2A. In this example, the growth (i.e., number of connections per degree) is substantially higher for the natural person 206 compared with the growth for the synthetic identity 210.

In one example implementation of the disclosed technology, geometric growth "rate" r associated with a given connection separation degree d may be calculated by:

$$r = \left(\frac{x_d}{x_0}\right)^{\frac{1}{d}} - 1,$$

where $x_d$ is the number of connections at a given separation degree, and $x_o$ is the initial number of connections (i.e., first degree connections). In certain example implementations, a difference (or delta) between starting and ending growth ratios may be calculated as follows:

SELF.d1:=1.d1;
SELF.d2:=1.d2;
SELF.d3:=1.d3;
SELF.d4:=1.d4;
t1:=((1.d2/1.d1))−1;
t2:=POWER(1.d3/1.d1,(1/2))−1;
t3:=POWER(1.d4/1.d1,(1/3))−1;
SELF.r1:=t1;
SELF.r2:=t2;
SELF.r3:=t3;
SELF.r2r1:=t2/t1;
SELF.r3r2:=t3/t1;
SELF.delta:=t3/t1−t2/t1;

where the "SELF.delta" is a difference between starting and ending growth ratios, and "SELF.dx" are counts of unique connection linking the target entity through the shortest or lowest degree path, as will be explained below. According to an example implementation of the disclosed technology, calculating the delta for an individual may include counting connections to unique individuals at their lowest observed degree to four degrees.

In an example implementation, the lowest degree path may be calculated as follows:

(A→B→C: A,C,2) represents the scenario where A connect to B who connects to C, with the shorthand "A, C, 2" representing: "A connects to C at 2 degrees."

(A→D→F→G→C: A,C,4) represents the scenario where A connects to D who connects to F who connects to G who connects to C, with the shorthand: "A, C, 4" representing: "A connects to C at 4 degrees." In accordance with certain example implementations of the disclosed technology, the third value in the shorthand represents the number of degrees of separation (i.e., hops) that C is from A. According to an example implementation of the disclosed technology, the lowest degree path is determined to calculate how "close" C is to A, and the connection numbers for this lowest degree path may be used in the calculation of the delta, as described above.

Figure 2C:
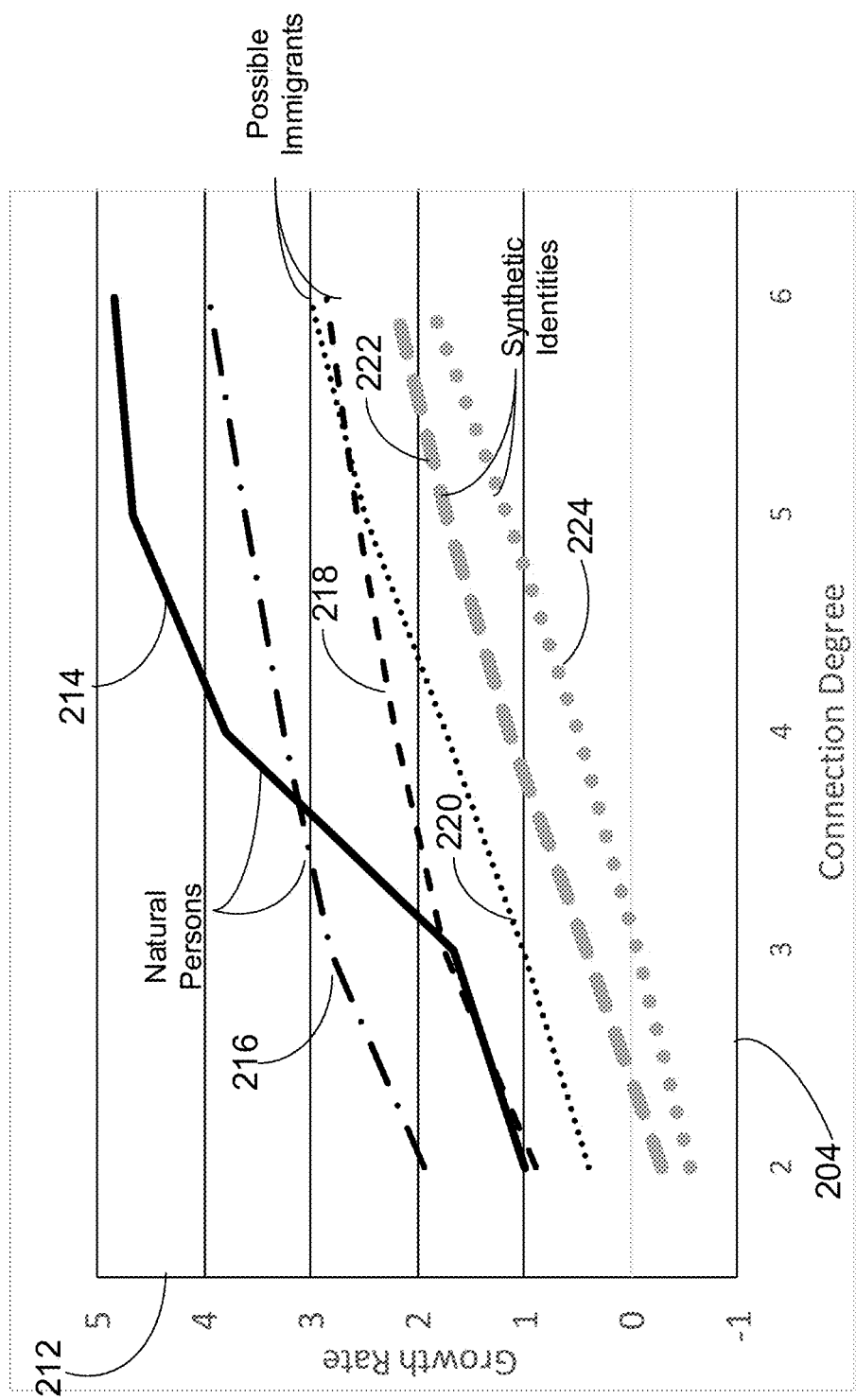
FIG. 2C illustrates connection growth per connection degree for example natural persons, example possible immigrants, and example synthetic identities.

FIG. 2C illustrates connection growth rates 212 per connection degree 204 for example natural persons 214, 216; example possible immigrants 218, 220; and example synthetic identities 222, 224 as a function of the connection degree. According to an example implementation of the disclosed technology, a threshold may be utilized to distinguish between synthetic identities and real entities. For example, a growth rate at the $4^{th}$ connection degree that is less than about 1.5 may indicate a synthetic identity. Similarly, a growth rate at the $5^{th}$ connection degree that is less than about 2.0 may indicate a synthetic identity. Certain implementations of the disclosed technology may utilize thresholds at one or more connection degrees to identify synthetic identities.

In accordance with certain example implementations, an entity graph may be determined for every known entity in a population. For example, embodiments of the disclosed technology may be utilized to determine entity graphs for each of the approximately 280 million known and unique entity representations in the United States. In an example implementation, entity networks for each of the 280 million entity representations may be determined out to about degree 4, resulting in about 2 billion records. Certain example implementations of the disclosed technology may calculate the growth rates for each of the records at each degree to determine entity representations that are actually or likely synthetic identities.

In certain example implementations, an entity's entity graph may include individuals who are related in some way, including, but not limited to family, business associates, friends, past roommates, etc. In an example embodiment, locations, addresses, or regions of an activity may be compared with current home and/or work addresses for the people in an individual's entity network. In certain example embodiments, a distance may be calculated between such locations. According to an example embodiment, such data may be utilized to identify certain patterns, confidence values, scores, etc. In an example implementation, all members of the entity network may be considered. In other example implementations, only individuals having certain connection criteria may be considered to reduce the computation complexity.

In accordance with certain example implementations of the disclosed technology, an entity's network graph may be determined based on public record information including, but not limited to housing records, vehicular records, marriage records, divorce records, hospital records, birth records, death records, court records, property records, employment records, business records, address records, tax records, corporate records, etc.

Certain embodiments of the disclosed technology may provide improved accuracy over conventional systems and techniques. For example, law enforcement departments attempting to identify perpetrators of certain fraudulent activities (such as identity theft) may utilize conventional focused analysis techniques that examine each event in isolation. The conventional techniques typically utilize high thresholds to filter the large number of events to be analyzed. In other words, because the data that must be analyzed with conventional techniques is so large, a high degree of suspicious activity may be required in order to identify individuals or entities associated with the activity. Without a high threshold, conventional techniques may have too many potentially fraudulent events to investigate. As a result, entities using conventional techniques often overlook collusion from groups that are able to stay below these high thresholds with respect to certain suspicious activities. The system and methods disclosed herein may be capable of efficiently leveraging readily available data to help detect individuals involved with generating synthetic identities, with a very low rate of false positives.

In one example embodiment, a domain of entities may be identified for analysis. For example, data associated with a large number (perhaps hundreds of millions) of individuals may be gathered for analysis. The data may include identities of individuals, organizations, companies, etc. The data may include information such as a physical address and/or relationship information. According to certain example embodiments of the disclosed technology, one or more types of relationships between the entities may then be collected.

In certain embodiments, a filtering mechanism may operate against the networks and may retain those networks that have outlying behavior. Such filtering may conventionally utilize graph-or network analysis, and queries/filtering of this form may utilize sub-graph matching routines or fuzzy sub-graphs matching. However, sub-graph matching routines or fuzzy-sub-graphs matching techniques may be NP-complete, and thus, impractical for analyzing large sets of data. The most notable characteristic of NP-complete problems is that no fast solution to them is known. That is, the time required to solve the problem using any currently known algorithm increases very quickly as the size of the problem grows. This means that the time required to solve even moderately sized versions of many of these problems can easily reach into the billions or trillions of years, using any amount of computing power available today. Embodiments of the disclosed technology may be utilized to determine or provide connections between entities even though the set of data analyzed may be extremely large.

In accordance with an example implementation of the disclosed technology, entities may be identified and may include people, companies, places, objects, virtual identities, etc. In an example embodiment, relationships may be formed in many ways, and with many qualities. For example, co-occurrence of values in common fields in a database may be utilized, such as the same last name. Relationships may also be formed using multiple co-occurrence of an entity with one or more other properties, such as people who have lived at two or more addresses.

Relationships may also be formed based on a high reoccurrence and/or frequency of a common relationship, according to an example embodiment. For example, records of person X sending an email to person Y greater than N times may indicate a relationship between person X and person Y. In another example embodiment, if person X sends an email to or receives an email from person Y, and within a short period of time, person Z sends an email or receives an email from person Y, then a relationship may be implied between person X and person Z.

In accordance with an example implementation of the disclosed technology, relationships between entities may comprise Boolean, weighted, directed, undirected, and/or combinations of multiple relationships. According to certain example embodiments of the disclosed technology, clustering of the entities may rely on relationships steps. In one embodiment, entities may be related by at least two different relationship types. In one embodiment, relationships for the network connection analysis may be established by examining weights or strengths of connections between entities in certain directions and conditional upon other relationships, including temporal relationships. For example, in one embodiment, the directional relationships between entities X, Y, and Z may be examined and the connection between X, Y, and Z may be followed if there is a link between Y and Z that happened (in time) after the link was established between X and Y.

Many methods may be utilized to filter networks once they are identified. For example, in one embodiment, networks may be scored. In another embodiment, a threshold may be utilized to identify networks of interest. According to an example embodiment of the disclosed technology, a model may be utilized to compute a number of statistics on each network. In one embodiment, the model may be as simple as determining counts. In another embodiment, the model may detect relationships within a network, for example, entities that are related to the centroid of the network that are also related to each other. This analysis may provide a measure of cohesiveness of relationships that exist inside the network. According to an example embodiment of the disclosed technology, once the statistics have been computed, scoring and weighting of each network may be utilized to determine which networks rise above a particular threshold, and may be classified as "interesting." In accordance with an example embodiment of the disclosed technology, and weighting and/or scoring of the determined statistics may be accomplished using a heuristic scoring model, such as linear regression, neural network analysis, etc.

Example implementations of the disclosed technology can utilize special-purpose computing systems and custom query language(s) in the processes described herein to provide meaningful results, as may be necessitated due to the sheer amount of data that needs to be tracked and analyzed.

Certain example implementations of the disclosed technology provide tangible improvements in computer processing speeds, memory utilization, and/or programming languages. Such improvements provide certain technical contributions that can enable the detection of relationships among individuals. In certain example implementations, the improved computer systems disclosed herein may enable analysis of an entire population, such as all known persons in the United States, together with associated activities. The computation of such a massive amount of data, at the scale required to provide effective outlier detection and information, has been enabled by the improvements in computer processing speeds, memory utilization, and/or programming language as disclosed herein. Those with ordinary skill in the art may recognize that traditional methods such as human activity, pen-and-paper analysis, or even traditional computation using general-purpose computers and/or off-the-shelf software, are not sufficient to provide the level of data processing required for effective relationship-linking at the scale contemplated for implementations of the disclosed technology. The special-purpose computers and special-purpose programming language(s) disclosed herein can provide improved computer speed, memory utilization, and/or reduction in disk read/write operations, which may provide an improvement in computing technology, thereby enabling the disclosed inventions.

Certain example implementations of the disclosed technology may be enabled a special purpose HPCC systems in combination with a special purpose software linking technology called Scalable Automated Linking Technology (SALT). SALT and HPCC, are developed and offered by LexisNexis Risk Solutions, Inc., the assignee of the disclosed technology. HPCC Systems, for example, provide data-intensive supercomputing platform(s) designed for solving big data problems. As an alternative to Hadoop, the HPCC Platform offers a consistent, single architecture for efficient processing. The SALT modules, in conjunction with the HPCC Systems, provides technical improvements in computer processing that enable the disclosed technology and provides useful, tangible results that may have previously been unattainable. For example, certain example implementation of the disclosed technology may process massive data sets, which are computationally intensive, requiring special software and hardware.

One of the issues that has plagued previous "relationship determination" solutions involving massive data sets is the extremely long run-times and large amount of memory/disk space required. One of the technical solutions provided by the technology disclosed herein concerns the enablement and efficiency improvement of computer systems and software to process relationship data, and to provide the desired data in a reasonable amount of time. Certain example implementations of the disclosed technology may be utilized to increase the efficiency of detection of identity-based fraud indicators such as the generation and use of synthetic identities.

Determining relationships among records, for example, can follow the classical n-squared process for both time and disk space. According to an example implementation of the disclosed technology, SALT provides a process in which light-weight self-joins may be utilized, for example, in generating embeddable common lisp (ECL). But disk-space utilization might still be high. Certain example implementations of the disclosed technology may enable a core join to be split into parts, each of which is persisted. This has the advantage of breaking a potentially very long join into n parts while allowing others a time slice. This has an effect of reducing disk consumption by a factor of n, provided the eventual links are fairly sparse. In terms of performance, it should be noted that if n can be made high enough that the output of each join does not spill to disk, the relationship calculation process may have significantly faster performance.

In accordance with certain example implementations, linking of records may be performed by certain additional special programming and analysis software. For example, record linking fits into a general class of data processing known as data integration, which can be defined as the problem of combining information from multiple heterogeneous data sources. Data integration can include data preparation steps such as parsing, profiling, cleansing, normalization, and parsing and standardization of the raw input data prior to record linkage to improve the quality of the input data and to make the data more consistent and comparable (these data preparation steps are sometimes referred to as ETL or extract, transform, load).

Some of the details for the use of SALT are included in the APPENDIX section of this application. According to an example implementation of the disclosed technology, SALT can provide data profiling and data hygiene applications to support the data preparation process. In addition, SALT provides a general data ingest application which allows input files to be combined or merged with an existing base file. SALT may be used to generate a parsing and classification engine for unstructured data which can be used for data preparation. The data preparation steps are usually followed by the actual record linking or clustering process. SALT provides applications for several different types of record linking including internal, external, and remote.

Data profiling, data hygiene and data source consistency checking, while key components of the record linking process, have their own value within the data integration process and may be supported by SALT for leverage even when record linking is not a necessary part of a particular data work unit. SALT uses advanced concepts such as term specificity to determine the relevance/weight of a particular field in the scope of the linking process, and a mathematical model based on the input data, rather than the need for hand coded user rules, which may be key to the overall efficiency of the method.

SALT may be used to prevent fraud by verifying identities, addresses and other factors, and using information on relationships to see where collusive activities might exist.

In accordance with an example implementation of the disclosed technology, and as discussed above, a persistent data structure may be utilized as part of splitting a core join, for example, to increase the performance of the computer processor and/or to reduce the disc/memory utilization requirements in determining relationships among records. The persistent data structure, according to certain example implementations of the disclosed technology, is a data structure that preserves the previous version of itself when it is modified. Such data structures may be effectively immutable, as their operations do not update the structure in-place, but instead may yield a new updated structure. Certain example implementations may utilize a meld or merge operation that can create a new version from two previous versions. In certain example implementations, the persistent data structure(s) can also be created using in-place updating of data and these may, in general, use less time or storage space than their purely functional counterparts. In certain example implementations, persistence can be achieved by simple copying. Certain example implementations of the disclosed technology exploit a similarity between the new and old versions to share structure between versions.

Certain embodiments of the disclosed technology may enable the detection of possible, probable, and/or actual synthetic identity-related fraud, for example, as associated with a request for credit, payment, or a benefit. Certain example implementations provide for disambiguating input information and determining a likelihood of a synthetic identity.

In accordance with an example implementation of the disclosed technology, input information associated with an entity network may be processed, weighted, scored, etc., for example, to disambiguate the information. Certain implementations, for example, may utilize one or more input data fields to verify or correct other input data fields.

In certain example implementations, data may be received from a first information source that is associated with the entity. For example, an entity may submit an application for certain benefits, services, credit, etc., and the application may contain certain identifying information received from the entity, such as name, social security number, address, etc. This "application information" may be considered as coming from the first information source, either directly from the entity, or via a vendor, business, governmental agency, etc. According to an example implementation of the disclosed technology, independent data from a second information source may be received to check or verify the entity supplied data that is received from the first information source. In certain example implementations, the independent information from the second source is not provided by the entity. However, in certain example implementation, all or a part of the entity-supplied information (such as received from the first information source) may be at least partially utilized in the generation of the independent information.

In an exemplary embodiment, a request for an activity may be utilized as input data. For example, a request may be for a tax refund. In one example embodiment, the request may include a requesting person's name, street address, and social security number (SSN), where the SSN has a typographical error (intentional or unintentional). In this example, one or more public or private databases may be searched to find reference records matching the input information. But since the input SSN is wrong, a reference record may be returned matching the name and street address, but with a different associated SSN. According to certain example implementations, the input information may be flagged, weighted, scored, and/or corrected based on one or more factors or metrics, including but not limited to: fields in the reference record(s) having field values that identically match, partially match, mismatch, etc., the corresponding field values.

Example embodiments of the disclosed technology may reduce false positives and increase the probability of identifying and stopping fraud based on one or more synthetic identities. According to an example implementation of the disclosed technology, a model may be utilized to process identity-related input information against reference information (for example, as obtained from one or more public or private databases) to determine whether the input identity being presented corresponds to a real identity, the correct identity, and/or a possibly synthetic identity.

Certain example implementations of the disclosed technology may determine or estimate a probability of a synthetic identity based upon a set of parameters. In an example implementation, the parameters may be utilized to examine the input data, such as name, address and social security number, for example, to determine if such data corresponds to a real identity. In an example implementation, the input data may be compared with the reference data, for example, to determine field value matches, mismatches, weighting, etc. In certain example implementations of the disclosed technology, the input data (or associated entity record) may be scored to indicate the probability that it corresponds to a real identity.

In some cases, a model may be utilized to score the input identity elements, for example, to look for imperfections in the input data. For example, if the input data is scored to have a sufficiently high probability that it corresponds to a real identity, even though there may be certain imperfections in the input or reference data, once these imperfections are found, the process may disambiguate the data. For example, in one implementation, the disambiguation may be utilized to determine how many other identities are associated with the input SSN. According to an example implementation, a control for relatives may be utilized to minimize the number of similar records, for example, as may be due to Jr. and Sr. designations.

In an example implementation, the container data may be utilized to derive a date-of-birth, for example, based on matching reference records. In one example implementation, the derived date-of-birth may be compared with the issue date of the SSN. If the dates of the SSN are before the DOB, then the flag may be appended for this record as indication of fraud.

Figure 3:
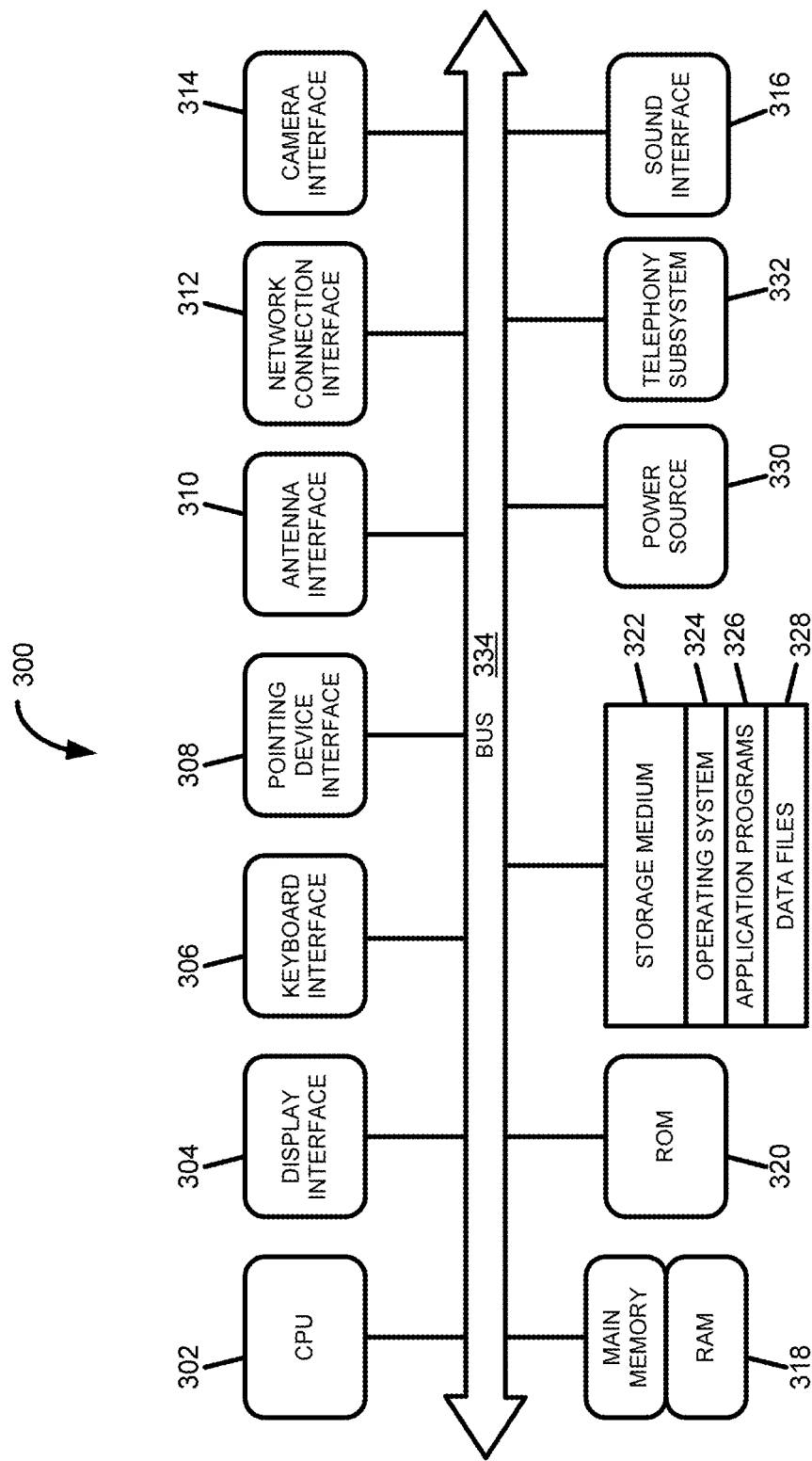
FIG. 3 illustrates a representative computer architecture, according to an example embodiment of the disclosed technology.

FIG. 3 depicts a block diagram of an illustrative computer system architecture 300 according to an example implementation of the disclosed technology. Various implementations and methods herein may be embodied in non-transitory computer readable media for execution by a processor. It will be understood that the architecture 300 is provided for example purposes only and does not limit the scope of the various implementations of the communication systems and methods. In certain example implementations, the system architecture 300 may be embodied in specialized HPCC Systems, as developed and offered by LexisNexis Risk Solutions, Inc., the assignee of the disclosed technology. HPCC Systems, for example, provide data-intensive supercomputing platform(s) designed for solving big data problems. Various implementations and methods herein may be embodied in non-transitory computer readable media for execution by a processor.

The architecture 300 of FIG. 3 includes a central processing unit (CPU) 302, where computer instructions are processed; a display interface 304 that acts as a communication interface and provides functions for rendering video, graphics, images, and texts on the display. In certain example implementations of the disclosed technology, the display interface 304 may be directly connected to a local display. In another example implementation, the display interface 304 may be configured for providing data, images, and other information for an external/remote display or computer that is not necessarily connected to the particular CPU 302. In certain example implementations, the display interface 304 may wirelessly communicate, for example, via a Wi-Fi channel or other available network connection interface 312 to an external/remote display.

The architecture 300 may include a keyboard interface 306 that provides a communication interface to a keyboard; and a pointing device interface 308 that provides a communication interface to a pointing device, mouse, and/or touch screen. Example implementations of the architecture 300 may include an antenna interface 310 that provides a communication interface to an antenna; a network connection interface 312 that provides a communication interface to a network. As mentioned above, the display interface 304 may be in communication with the network connection interface 312, for example, to provide information for display on a remote display that is not directly connected or attached to the system. In certain implementations, a camera interface 314 may be provided that may act as a communication interface and/or provide functions for capturing digital images from a camera. In certain implementations, a sound interface 316 is provided as a communication interface for converting sound into electrical signals using a microphone and for converting electrical signals into sound using a speaker. According to example implementations, a random-access memory (RAM) 318 is provided, where computer instructions and data may be stored in a volatile memory device for processing by the CPU 302.

According to an example implementation, the architecture 300 includes a read-only memory (ROM) 320 where invariant low-level system code or data for basic system functions such as basic input and output (I/O), startup, or reception of keystrokes from a keyboard are stored in a non-volatile memory device. According to an example implementation, the architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 and data files 328 are stored. The application programs 326 may include instructions for organizing, storing, retrieving, comparing, and/or analyzing the various connections associated with the properties and entities associated with embodiments of the disclosed technology. According to example implementations of the disclosed technology, the analysis system, the clustering unit, and/or the scoring unit may be embodied, at least in part, via the application programs 326 interacting with data from the ROM 320 or other memory storage medium 322, and may be enabled by interaction with the operating system 324 via the CPU 302 and bus 334.

According to an example implementation, the architecture 300 includes a power source 330 that provides an appropriate alternating current (AC) or direct current (DC) to power components. According to an example implementation, the architecture 300 may include and a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the data may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

In accordance with an example implementation of the disclosed technology, the special-purpose hardware and instruction set may enable processing of a massive number of records to detect indicators of fraudulent activity. In some instances, the number of records when the initial data build is assembled, can approach or exceed 3 billion records in number. In accordance with an example implementation of the disclosed technology, these records may be processed by SALT to produce a relative build that can result in even more records and relationships. For example, in some instances, the number of records in the relative build can approach or exceed 30 billion records in number.

In accordance with an example implementation of the disclosed technology, the relative build records may be post-processed to provide a reduced set of records (for example approximately 14 billion records). This reduction in the number of records can be a result of eliminating duplicates, scrubbing data, correcting data errors, removing records having low accuracy or linkage confidence etc. In certain example implementations, the reduced set of records can include relationship type, relationship history, linkages among individual IDs, etc. In accordance with an example implementation, relationship linking may be calculated via graph analytics with the Knowledge Engineering Language (KEL) and/or SALT, as previously discussed, which may provide certain speed, efficiency, and/or memory utilization advantages over previous computation languages.

Certain example implementations of the disclosed technology may enable identification of errors in data. For example, data provided by information vendors can include errors that, if left undetected, could produce erroneous results. Certain example implementations of the disclosed technology may be used to measure the accuracy and/or quality of the available data, for example by cross-checking, so that the data be included, scrubbed, corrected, or rejected before utilizing such data in the full analysis. In accordance with an example embodiment of the disclosed technology, such data quality may be determined and/or improved by one or more of cross checking, scrubbing to correct errors, and scoring to use or reject the data.

Figure 4:
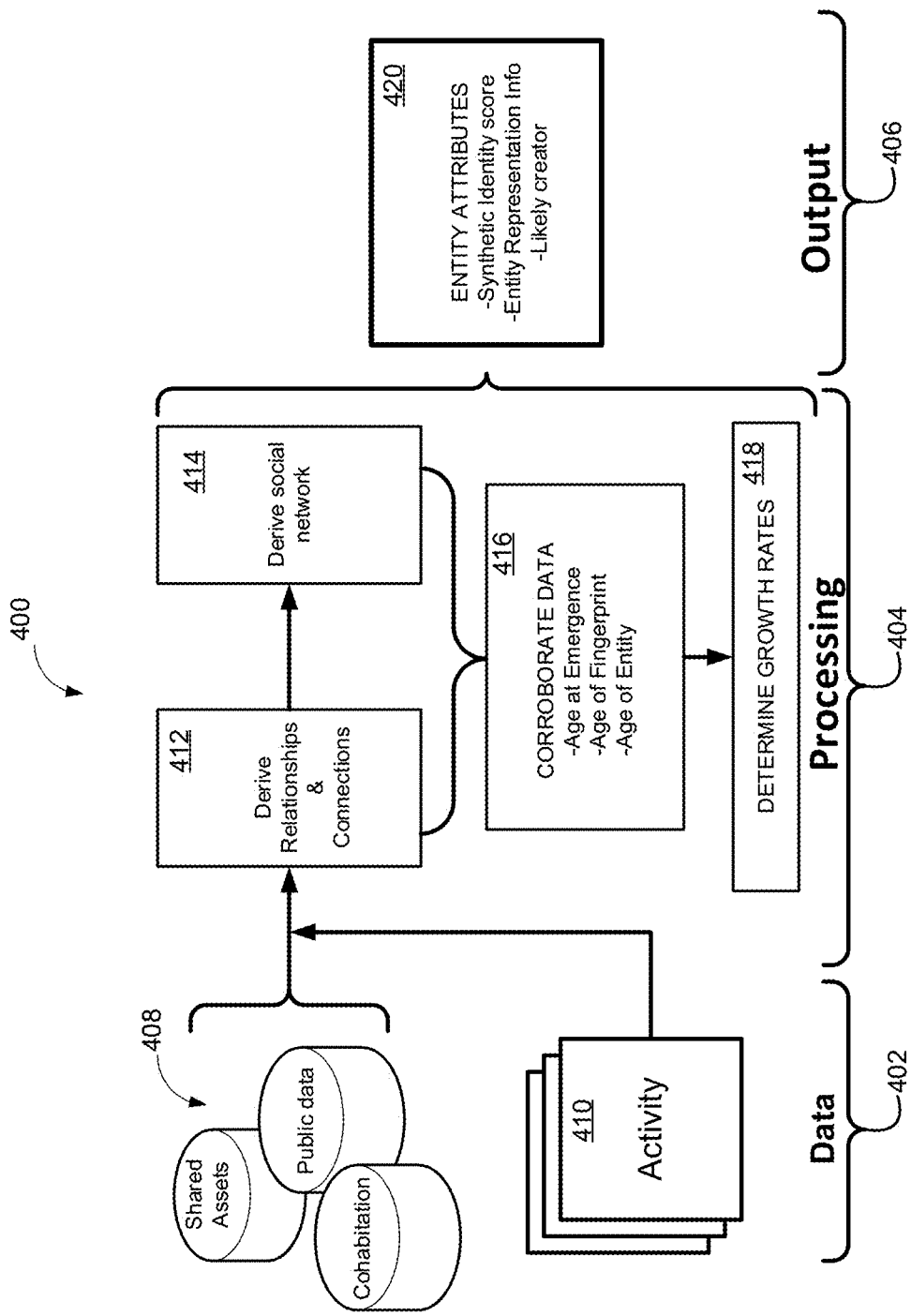
FIG. 4 is a block diagram of an entity network growth rate calculation process, according to an example embodiment of the disclosed technology.

FIG. 4 is a block diagram of an entity network growth rate calculation process 400, according to an example embodiment of the disclosed technology. The process 400 may fetch and/or receive a plurality of data 402 to be analyzed. In certain example implementations, a portion of the data 402 may be stored locally. In certain example implementations, all or a portion of the data may be available via one or more local or networked databases 408. In accordance with an example embodiment, the data 402 may be processed 404, and output 406 may be generated. In one example embodiment, the data 402 may include information about shared assets, cohabitation, and/or additional public data that may be indicative of a connection between two entity representations. In certain example implementations, the data 402 may include activity information 410 associated with some or all of the entity representations, including but not limited to time-frames in which particular addresses are associated with corresponding identities.

In an example embodiment, the process 400 may receive the data 402 in its various forms and may process 404 the data 402 to derive relationships and connections 412. In certain example implementations, the relationships may be utilized to derive an entity network 414 of some or all of the entity representations. In an example embodiment, the data used to derive the relationships, connections 412 and entity networks 414 may be checked or corroborated 416 for self-consistency, for example, by comparing age of emergence, age of the entity data fingerprint, and the age of the entity. If such data is inconsistent, the associated records may be flagged. Certain example implementations of the disclosed technology may enable identification of errors in data. For example, data provided by information vendors can include errors that, if left undetected, could produce erroneous results. Certain example implementations of the disclosed technology may be used to measure the accuracy and/or quality of the available data, for example by cross-checking, so that the data be included, scrubbed, corrected, or rejected before utilizing such data in deriving entity network connections. In accordance with an example embodiment of the disclosed technology, such data quality may be determined and/or improved by one or more of cross checking, scrubbing to correct errors, and scoring to use or reject the data.

In accordance with certain example implementations of the disclosed technology, the derived entity networks 414 may be processed to determine growth 418 of the networks, as previously discussed. According to an example embodiment of the disclosed technology, the determined growth 418 may be processed 406 to produce and output 406, which may include entity attributes 420 such as a score of likelihood that the entity is a synthetic identity, entity representation information for the synthetic identity, and/or an indication of a possible creator of the synthetic identity.

In accordance with an example implementation of the disclosed technology, the process 400 may leverage publicly available data, which may include several hundred million records. The process 400 may also clean and standardize data to reduce the possibility that matching entities are considered as distinct. Before creating a graph, the process 400 may use this data to build a large-scale network of the population in question and its associated connections.

According to an example implementation, the process 400 may leverage a relatively large-scale of supercomputing power and analytics to target organized collusion. Example implementation of the disclosed technology of the systems and methods disclosed herein may rely upon large scale, special-purpose, parallel-processing computing platforms to increase the agility and scale of solutions.

Example implementations of the disclosed technology of the systems and methods disclosed herein may measure behavior, activities, and/or relationships to actively and effectively expose syndicates and rings of collusion. Unlike many conventional systems, the systems and methods disclosed herein need not be limited to activities or rings operating in a single geographic location, and it need not be limited to short time periods. The systems and methods disclosed herein may be used to determine whether the generation of synthetic identities fall within an organized ring or certain geographical location.

In one example implementation, a filter may be utilized to reduce the data set to identify groups that evidence the greatest connectedness based on the scoring algorithm. In one example implementation, systems and methods disclosed herein may utilize scores that match or exceed a predetermined set of criteria may be flagged for evaluation. In an example implementation of the disclosed technology, filtering may utilize one or more target scores, which may be selected based on the scoring algorithm. In one example implementation, geo-entity networks having scores greater than or equal to a target score may be flagged as being potentially collusive.

Figure 5:
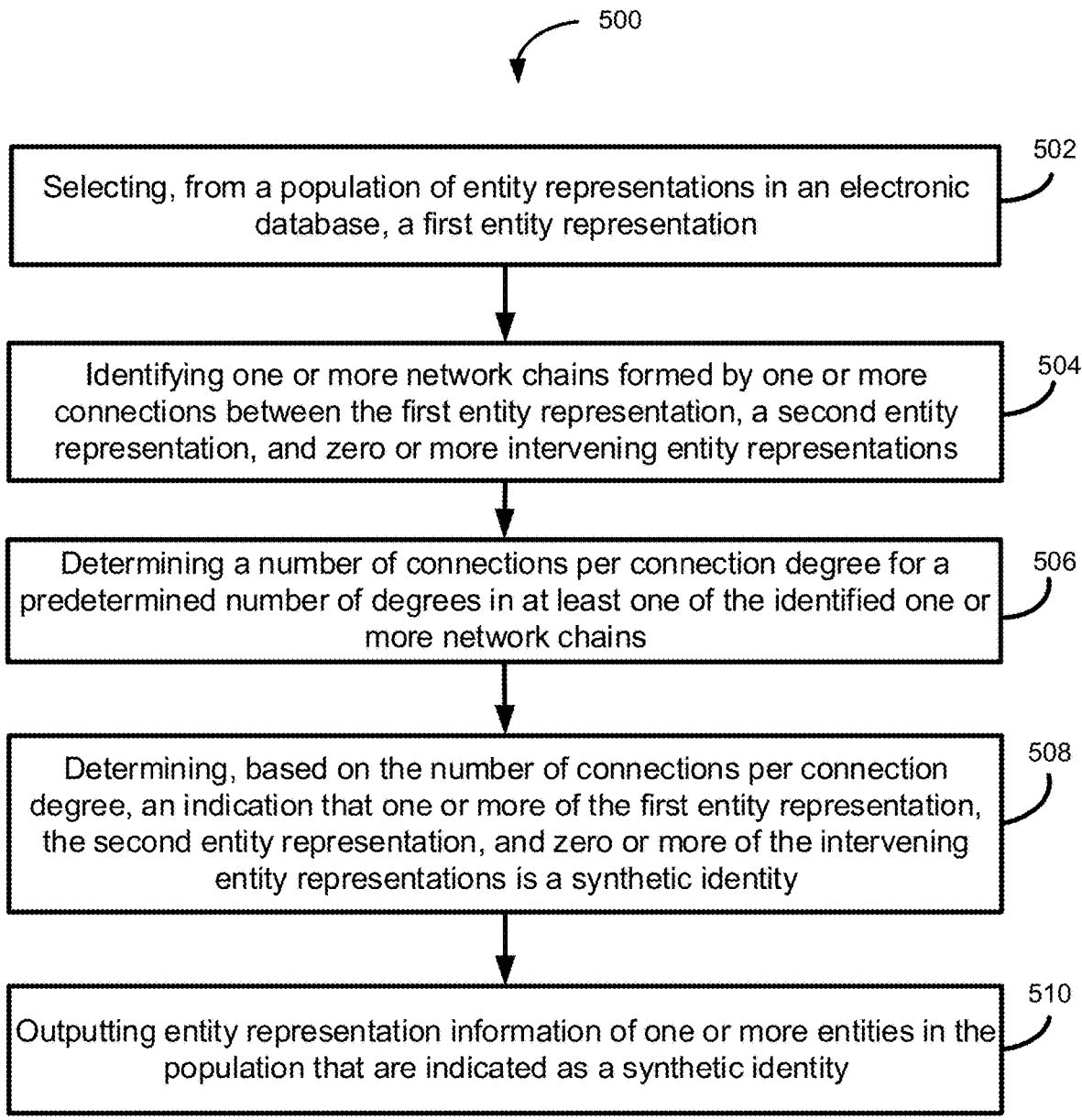
FIG. 5 is a flow-diagram of a method, according to an example embodiment of the disclosed technology.

An example method 500 for identifying one or more synthetic identities will now be described with reference to the flowchart of FIG. 5. The method 500 starts in block 502, and according to an example implementation includes selecting, from a population of entity representations in an electronic database, a first entity representation. In block 504, the method 500 includes identifying one or more network chains formed by one or more connections between the first entity representation, a second entity representation, and zero or more intervening entity representations. In block 506, the method 500 includes determining a number of connections per connection degree for a predetermined number of degrees in at least one of the identified one or more network chains. In block 508, the method 500 includes determining, based on the number of connections per connection degree, an indication that one or more of the first entity representation, the second entity representation, and zero or more of the intervening entity representations is a synthetic identity. In block 510, the method 500 includes outputting entity representation information of one or more entities in the population that are indicated as a synthetic identity.

In certain example implementations, determining the number of connections per connection degree can include determining a shortest network chain of the identified one or more network chains; and determining the number of connections for each connection degree in the shortest network chain.

In certain example implementations, determining an indication that one or more of the first entity representation, the second entity representation, and zero or more of the intervening entity representations is a synthetic identity is further based on establishment dates of the one or more connections.

In certain example implementations, the one or more connections can include one or more of relative connections, business associate connections, social network connections, common asset connections, and historical address connections.

According to an example implementation of the disclosed technology, a system graph may be utilized to determine the one or more connections, wherein the system graph comprises information associated with one or more public records including one or more of housing records, vehicular records, marriage records, divorce records, hospital records, death records, court records, property records, employment records, business records, address records, tax records, corporate records, incarceration records, and utility records, wherein the utility records comprise one or more of utility hookups, disconnects, and associated service addresses.

According to an example implementation of the disclosed technology, the one or more connections are based at least in part on a distance between geographical regions proximate to a plurality of locations associated with one or more activities common to the entity representations.

Certain example implementations of the disclosed technology may further include determining geometric growth ratios of the one or more connections between the first entity representation, the second entity representation, and the zero or more intervening entity representations, and wherein the indication is further based on the determined geometric growth ratios.

In certain example implementations, the indication may be further based on differences between the determined geometric growth ratios.

According to an example implementation of the disclosed technology, the population of entity representations can include 10 million or more entities.

In certain example implementations, the predetermined number of degrees is five or less.

Figure 6:
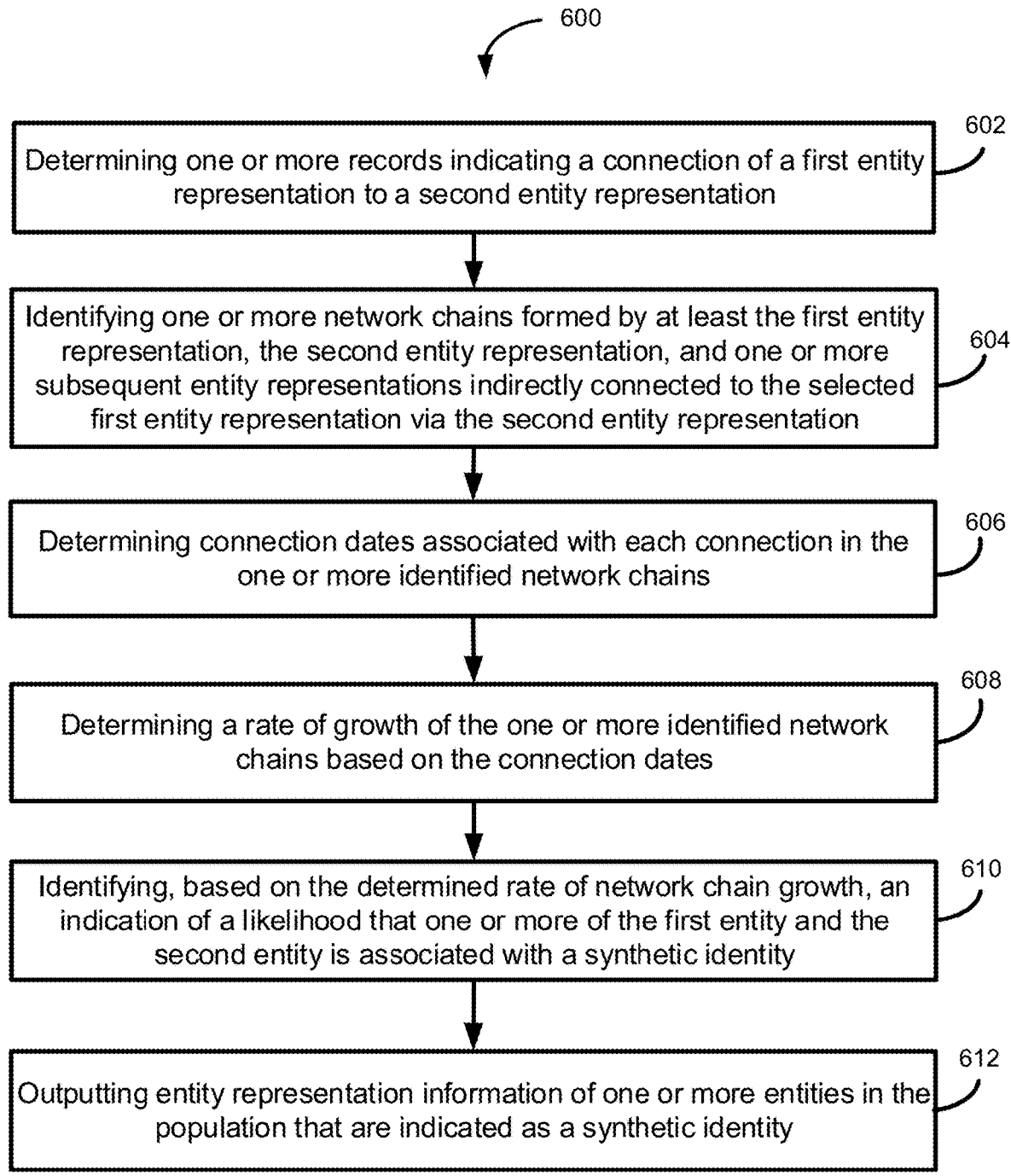
FIG. 6 is flow-diagram of another method, according to an example embodiment of the disclosed technology.

Another example method 600 for identifying one or more synthetic identities will now be described with reference to the flowchart of FIG. 6. The method 600 starts in block 602, and according to an example implementation includes determining one or more records indicating a connection of a first entity representation to a second entity representation. In block 604, the method 600 includes identifying one or more network chains formed by at least the first entity representation, the second entity representation, and one or more subsequent entity representations indirectly connected to the selected first entity representation via the second entity representation. In block 606, the method 600 includes determining connection dates associated with each connection in the one or more identified network chains. In block 608, the method 600 includes determining a rate of growth of the one or more identified network chains based on the connection dates. In block 610, the method 600 includes identifying, based on the determined rate of network chain growth, an indication of a likelihood that one or more of the first entity and the second entity is associated with a synthetic identity. In block 612, the method 600 includes outputting entity representation information of one or more entities in the population that are indicated as a synthetic identity.

Certain example implementations of the disclosed technology may further include storing in a third field of a record associated with the selected first entity representation, an indication of the determined highest rate of growth associated with identified network chains that include the second entity representation.

According to an example implementation of the disclosed technology, determining the one or more records indicating a connection of the selected first entity representation to the second entity representation comprises determining a lowest-order degree connection based at least in part on an earliest date of one or more connection establishment dates.

In an example implementation, first-degree connection of the first entity representation to a second entity representation can include one or more of relative connections, business associate connections, entity network connections, and historical address connections.

According to an example implementation of the disclosed technology, a system graph is utilized to determine a first-degree connection of the first entity representation to a second entity representation. The system graph can include information associated with one or more public records including one or more of housing records, vehicular records, marriage records, divorce records, hospital records, death records, court records, property records, employment records, business records, address records, tax records, corporate records, incarceration records, and utility records, wherein the utility records comprise one or more of utility hookups, disconnects, and associated service addresses.

In certain example implementations, a connection of the first entity representation to a second entity representation is based at least in part on a distance between geographical regions proximate to a plurality of locations associated with one or more activities common to both the first and second entity representations.

According to an example implementation of the disclosed technology, the rate of growth is based on a number of connections and dates of the connections.

Certain example implementations of the disclosed technology may include ordering entity representations by growth rate.

Certain example implementations of the disclosed technology may include outputting indications identifying entity representations having a growth rate above a selected threshold.

According to an example implementation of the disclosed technology, the population of entity representations can include 10 million or more entities.

Certain implementations of the disclosed technology may be used to identify potential organizations of identity theft, fraud, or other activities which may be spread-out geographically. For example, the input data for the system graph may be derived from historical address history of a population to be examined and such address history may be used to link individuals based on, for example, familial, residential, and business relationships. Embodiments of the disclosed technology may use such information to determine connections, weight metrics, and/or score the data.

According to example implementations, certain technical effects can be provided, such as creating certain systems and methods that are able to identify someone who is connected to various other entities. Embodiments of the disclosed technology may be utilized to examine the entity network growth at various degrees of separation to identify possible synthetic identities. According to example implementations, certain technical effects can be provided, such as creating certain systems and methods that are able to identify someone who has generated a synthetic identity.

Without limitation, some features considered for determining connections with respect to embodiments disclosed may include the number of people in one's social, family, or business network who live or work close proximity; the geographical spread of one's entity network; and the rate of identity misrepresentation in one's network. Analysis of these features, according to an example embodiment, may enable the system to identify, among others, social, family, or business networks that have a high correlation with fraudulent activity. As indicated previously, such incidents may be associated with synthetic identities, but embodiments disclosed may apply to other applications in which entity network growth rates may be utilized for identifying certain individuals.

Various embodiments of the systems and methods disclosed herein may be embodied, in whole or in part, in a computer program product stored on non-transitory computer-readable media for execution by one or more processors. It will thus be understood that various aspects of the disclosed technology may comprise hardware or software of a computer system, as discussed above with respect to FIG. 3. It will also be understood that, although these units may be discussed herein as being distinct from one another, they may be implemented in various ways. The distinctions between them throughout this disclosure are made for illustrative purposes only, based on operational distinctiveness.

Application of the various embodiments of the systems and methods disclosed herein need not be limited to those above. For example, an example may be used to identify potential activity related to credit card application misrepresentation, identity fraud, investment fraud, crimes, business fraud, mail and/or delivery fraud, and various other various types of activities that might involve geographical information, shared assets, cohabitation and/or other entity network connections.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

APPENDIX

Salt for Relationship Linking

RELATIONSHIP:relationshipname:BASIS(FieldList): DEDUP(FieldList)
[:SCORE(FieldList)][:TRACK(FieldList)IMULTIPLE (n)li:SPLIT(n)]
[:TH RESHOLD(n)][: BLOCKTHRESHOLD(n)]
RELATIONSHIP:relationshipname:RelationshipList
[:MULTIPLE(n)] [:THRESHOLD(n)] [:BLOCKTHRESHOLD(n)]
[:LINK(NONEIALLIDIRECTICROSS)]

| | |
|---|---|
| relationshipname | User-specified logical name for an entity relationship to be computed in the relationship module |
| BASIS(fieldlist) | Specifies the basis for the relationship using the list of fields specified in the fieldlist parameter. The fieldlist contains a list of field names separated by a colon ':' character which must be equal between record pairs. Fields specified in the fieldlist following a :?: must be equal or null (left.field = right.field or left.field = null or right.field = null). Fields following a :-: implies the fields must not match. Fuzzy matching of fields is not currently supported. |
| DEDUP(fieldlist) | Specifies a list of field names separated by the colon ':' character for deduping when matching record pairs between clusters to compute the relationship count. The DEDUP prevents overcounting when a cluster contains multiple records containing equal basis fields. Typically the fieldlist is the same as the fixed portion of the BASIS fieldlist. DEDUP fields must be part of the BASIS. |
| SCORE(fieldlist) | Specifies an optional list of fields separated by the colon ':' character which will be independently scored once per relationship. Fields following a :-: will be negated for the purpose of computing the threshold. SCORE fields cannot be part of the BASIS. |
| TRACK(fieldlist) | Specifies an optional list of RECORDDATE fields, to be used for tracking the dates over which relationship information is gathered. |
| MULTIPLE(n) | Specifies the minimum number of entity links n which must occur before a relationship is declared. |
| SPLIT(n) | Specifies the number of different persists that the main relationship join is split into (default if not specified is 1). Can improve performance and reduce disk space utilization. |
| THRESHOLD(n) | In SALT relationships are scored the same as internal linking, the same internal linking match threshold must be exceeded for a relationship to be declared (counted). The default threshold is the global default for internal linking. The THRESHOLD(n) parameter allows the default value to be overridden. |
| BLOCKTHRESHOLD(n) | BLOCKTHRESHOLD can be used to override the default block threshold used to compute relationships (which is five less than the overall default threshold). Lower numbers = more matches and slower times. |
| LINK(NONEIALLIDIRECTICROSS) | The LINK parameter is used to define how a given relationship is used to create link candidates for internal linking. The default is LINK(ALL). If LINK(NONE) is specified, the relationship will not take part in internal linking. If LINK(DIRECT) is specified, the relationship will cause the two sides of the relationship to be considered as possibly two halves of the same entity. If LINK(CROSS) is specified, then if D1 r D2 & D1 r D3, then Cross will cause D2 & D3 to be considered as possible entity link candidates. If LINK(A11) is specified, both the DIRECT & CROSS options are evaluated. Note: the relationship basis will be used to SUPPORT the fields of the basis in the matching logic. Thus if you have a |

| | |
|---|---|
| | BASIS of (fname:lname) - then the NAME concept will be SUPPORTed by whatever the basis score is. This gives a way to get a very strong score for a field match if 2 (or more) relatively weak values for that field match between two entities. (For a fuller explanation of SUPPORT - see ATTRIBUTEFILE) |
| RelationshipList | The second form of the RELATIONSHIP statement allows a relationship to be formed as the sum of other relationships. The RelationshipList parameter allows a list of relationship names separated by the colon ':' character to be specified. |

SALT internal linking provides the capability to cluster together records to form an entity. In some situations, the objective is not to determine that two records or clusters are close enough to become part of the same entity, but to determine if a statistically significant link exists between the two clusters and to record this relationship. The RELATIONSHIP statement provides this function.

When clustering single entities using SALT internal linking, there may be insufficient information within one record to perform a link even with propagation of field values. SALT internal linking will leave those records unmatched. Relationships provide a way to record instances when multiple occurrences of specific set of fields (the BASIS field list) matching between clusters provide an additional clue that a match may exist. For example, when a name match isn't strong, but a first name, middle name and two different last names matching between clusters is becoming a lot stronger. Relationships are not currently used automatically as part of SALT linking, however using the RELATIONSHIP statement SALT can produce an additional relationship file that can be used to create an ATTRIBUTEFILE as input to another SALT process. For example, if you have a relationship between entity ID1 and ID2, the relationship file can be deduped and projected so that ID1⊠ID2 and ID2⊠ID1 are both in the file, then use an ATTRIBUTEFILE statement that declares one ID as the IDFIELD and the other ID as the VALUES field. See description below of the output format for a relationship file.

The core part of a SALT relationship is the BASIS; the basis is the list of fields which must be identical between two clusters for a linkage to exist. Fields following a :?: field in the basis field list must be identical or one must be null. Thus a relationship which counts and weighs the number of shared addresses between two clusters could be:
 RELATIONSHIP:COHABIT:BASIS(PRIMNAME:
PRIMRANGE:CITYNAME:ST:?:SECRANGE)

Note that the sec-range comes after the :?: that defines that either they must be equal or one must be null.

You can also a ATTRIBUTEFILE VALUES field as part of the BASIS for a relationship.

As it stands this would count all of the record-pairs between two clusters which match, however if a cluster had two or more copies of an address it could double count. To avoid this issue you also specify a DEDUP criteria as a field list to dedup. It would be normal for the DEDUP criteria to be the same as the fixed portion of the basis. However for addresses there can often be multiple names for one road and multiple ways of expressing one city. Thus it is usually safest to simply dedup using the prim_range. For example:
 RELATIONSHIP:COHABIT:BASIS(PRIM_NAME:
    PRIM_RANGE:CITY_NAME:ST:?:SEC_RANGE):
    DEDUP(PRIM_RANGE)

It should be noted that the DEDUP performs a smart dedup, it will actually look for the strongest link found for a given value of a DEDUP field. In the example presented above, if a link had been found with and without the sec range it will use the one which includes the sec-range value. If DEDUP is omitted, it defaults to the whole of the basis. SALT also checks to insure that all DEDUP elements are from the BASIS definition.

Within SALT relationship fields are scored the same as in internal linking and by default a linkage is declared if the internal linking match threshold is exceeded. This can be overridden using the THRESHOLD parameter on the RELATIONSHIP statement. As addresses usually have a specificity of around 28 it will generally then take 2 or more to cause a relationship to be declared. If you wish to force that a certain number of different links need to be found between clusters before declaring a relationship then you can use the :MULTIPLE(n) option. Here n is the minimum number of linkages that must have been found. A linkage occurs between any two entity identifiers which share a common value for a given basis.

Sometimes you want to be able to use other information in the record outside of the basis to support the declaration of a linkage but without requiring it as part of the basis. For example, sharing of one address between two identifiers is probably not significant but if the identifiers also share an SSN or share a last name there is more likelihood of a relationship. These supporting fields can be declared using the SCORE parameter on the RELATIONSHIP statement with its associated field list. For example:
 RELATIONSHIP:COHABIT:BASIS(PRIM_NAME:
PRIM_RANGE:CITY_NAME:ST:?:SEC_RANGE):DEDUP(PRIMRANGE):SCORE(SSN:LNAME)

The fields in the score list are independent and will be maximized across all of the linkages taking part in one relationship (if more than one RELATIONSHIP statement have the same field in the SCORE list, the highest score for that field will be used for all RELATIONSHIP statements).

An issue with relationships is getting them to run in a reasonable amount of time. Relationships are the classical n-squared process and the n-squared is true of both time and disk space. SALT does a lot of work to optimize this process which results in a light-weight self-joins being used in the generated ECL, but disk-space utilization could still be high. The SPLIT(n) parameter on the RELATIONSHIP statement allows the core join to be split into parts each of which is persisted. This has the advantage of breaking a potentially very long join into n parts (allowing others a time slice) but also reduces disk consumption by a factor of n (provided the eventual links are fairly sparse). In terms of performance it should be noted that if n can be made high enough that the output of each join does not spill to disk then the relationship calculation process will have significantly faster performance. The following example shows the use of the SPLIT (n) parameter:

RELATIONSHIP:COHABIT:BASIS(PRIM_NAME: PRIM_RANGE:CITY_NAME:ST:?:SEC_RAN GE):SPLIT(16):SCORE(LNAME:SSN):DEDUP(PRIMRANGE)

It is possible to have multiple RELATIONSHIP statements defined in one specification file. Each RELATIONSHIP is independently computed. The output for the relationship specified will be in the following format:

```
CombinationRecord := RECORD
    unsigned6 ID1;
    unsigned6 ID2;
    unsigned2 Basis_score; // Score allocated to the basis
    relationship unsigned2 Dedup_Val; // Hash will be stored in here
    to dedup unsigned2 Cnt; // Number of different basis matches
    shared between // clusters
    unsigned1 LNAME_score; // Independent score for the LNAME field
    unsigned1 SSN_score; // Independent score for the SSN field END;
```

ID1 and ID2 are the entity IDs being linked. The Basis score is the accumulated score across all of the (deduped) basis matches that form the relationship. The Dedup Val field is used for computation and may be ignored. Cnt is the number of different basis matches being used in the relationship. Then will come a score for each score field which has been maximized across all the basis matches in the relationship. The total score used to determine whether or not the matching threshold is exceeded is Basisscore+Lnamescore+SSN score.

Any field (BASIS or SCORE) which is part of a CONCEPT definition will be weighted appropriately when used inside BASIS or SCORE.

Relationships and Dates

It is possible to track the dates over which relationship information is gathered; provided you have RECORDDATE fields in your SPC. Any relationship can have a track list. TRACKing is there to provide date information about the relationship—it does NOT change the relationship computation in any way (other than possibly making it a little slower). For example:

```
RELATIONSHIP:COHABIT:BASIS(PRIM_NAME:PRIM_RANGE:CITY_NAME:ST:?:SEC_RANGE
):SCORE(LNAME:SSN):DEDUP(PRIM_RANGE):THRESHOLD(35):TRACK(dt_first_seen:d
t_last_seen)
RELATIONSHIP:CONAME:BASIS(FNAME:LNAME):MULTIPLE(2):TRACK(dt_first_seen
:dt_last_seen)
```

The system will then track for a 'first' date—the first date that BOTH elements of a relationship have a fact. For a 'last' date in is the last date that BOTH elements of a relationship share that fact. If a relationship is based upon multiple co-incidences it will find the earliest shared fact for a 'first' date and the latest shared fact for a last date. This is a slightly weird combination of mins and maxes—but semantically it works. As an example:

A lives at 123 Main Street from 19800101 to 19900101
B lives at 123 Main Street from 19850101 to 19870101
A lives at 456 High Street from 19900101 to 20000101
B lives at 456 High Street from 19870101 to 20100101

The system first computes the 'fact coincidence dates:
A&B share 123 Main Street from 19850101 to 19870101
  (the shorter range when both are there)
A&B share 456 High Street from 19900101 to 200000101
  (the shorter range when both are there)

Now the EARLIEST shared fact date is 19850101 and the latest shared fact date is 20000101. These represent an UPPER bound on the start of the relationship and a lower bound on the end of it.

NOTE: if shared facts do NOT overlap in time it is possible for the 'first' date to be after the 'last' date.

It is also possible to enforce some degree of date overlap within a single relationship. This is done by defining a RANGE field upon the two record dates. eg:

```
FIELD:dt_first_seen:RECORDDATE(FIRST,YYYYMM):5,0
FIELD:dt_last_seen:RECORDDATE(LAST,YYYYMM):5,0
RANGEFIELD:ReportedDate:RANGE(dt_first_seen,dt_last_seen):5,0
```

The two record-dates may be TRACKed if required (or not). ReportedDate can now be used as a (fairly) 'regular' field in the basis or score portion of a relationship. eg:

```
RELATIONSHIP:COHABIT:BASIS(PRIM_NAME:PRIM_RANGE:CITY_NAME:ST:?:SEC_RANGE)
:SCORE(SSN:LNAME:REPORTEDDATE):DEDUP(PRIM_RANGE):THRESHOLD(35):TRACK(dt_f
irst_seen:dt_last_seen)
RELATIONSHIP:CONAME:BASIS(FNAME:LNAME:?:REPORTEDDATE):MULTIPLE(2):TRACK
(dt_first_seen)
RELATIONSHIP:COSSN:BASIS(SSN:REPORTEDDATE):SCORE(LNAME):THRESHOLD(35):TRA
CK(dtlastseen)
```

Notes:

1. In a score the Global specificity for a date overlap is used (same as in internal linking)

2. In the optional portion of a basis—the dates can overlap OR one record not have a date 3. In the fixed portion of a basis—there MUST be overlap in the dates. NOTE: A range field CANNOT be the ONLY (or FIRST) element of a basis Combining Relationships with Different BASIS into a Single Relationship It is also possible to define a relationship based upon other relationships. This is done using the relationship list. All relationships in the list must be normal relationships, grandparents are not allowed. This definition uses the second form of the RELATIONSHIP statement. Consider the following example which combines a COHABIT relationship with a COSSN relationship to form an association:

```
RELATIONSHIP:COHABIT:BASIS(PRIM_NAME:PRIM_RANGE:CITY_NAME:ST:?:SEC_RANGE)
:SPLIT(16):SCORE(LNA4E:SSN):DEDUP(PRIM_RANGE):THRESHOLD(30)
RELATIONSHIP:COSSN:BASIS(SSN):SCORE(LNAME):DEDUP(SSN):MULTIPLE(2)
RELATIONSHIP:ASSOC:COHABIT:COSSN
```

This has two normal relationships and one that associates the other two together into a unified score. It should be noted that because the normal relationships are eventually going to be wired together by an association, you may need to weaken them as shown in the example using the THRESHOLD statement. Thus the THRESHOLD(30) on COHABIT may be enough to capture a very rare single address (40 is the typical person threshold in the LexisNexis person data). For COSSN the MULTIPLE(2) parameter forces pairs of matching SSN for a relationship; this is an efficiency gained from the fact that a single SSN match is already being caught be the SCORE on COHABIT.

In principle ASSOC then simply combines the two underlying relationships together and adds the scores; it is therefore very efficient and uses the stored results of the two normal relationships. However there is an issue in that between the child relationships there can easily be a lot of double-counting occurring because either:
 a) Two relationships have identical fields in the SCORE attribute (in this case both have LNAME)
 b) The SCORE attribute of one relationship might be part of the basis of another relationship (in this case COHABIT scores SSN which is part of the basis of COSSN)

SALT automatically picks this apart and:
 a) Only picks the best score when multiple SCOREs clash
 b) Assigns the SCORE from one relationship to the basis field of the other relationship and then does a MAX across those. (This is how a single SSN match gets picked up even though it is forbidden in COSSN).

Then the MULTIPLE and THRESHOLD parameters (or defaults) are applied to the child relationship. Thus a MULTIPLE(3) will require 3 different data matches to have occurred between COHABIT and COSSN.

A lot of the detail of the child relationships is preserved in the output generated for a combined relationship. The format for the ASSOC example would be:

```
shared ASSOCCRec:= RECORD
  unsigned6 ID1; unsigned6 ID2;
  unsigned2 Total_Score:= 0;
  unsigned2 Total Cnt 0;
  unsigned2 COHABIT_score:= 0;
  unsigned1 COHABIT_cnt:= 0;
  unsigned2 COSSN_score:= 0;
  unsigned1 COSSN_cnt:= 0;
  unsigned1 LNAME_score:= 0;
  // Score for SSN will be rolled into COSSN as it is part of basis
  END
```

Individual keys are also built by SALT for all relationships which are of included as part of another relationship. In addition, a relationship service is built for each relationship that is not the child of another one. This service takes a UID (unique id) and a depth and will produce rolled up data for every relationship in the tree that many levels deep. The tree walking aspect of this service is in the relationship_links module. The tree is walked so that each level of the tree is joined to the branch before via the strongest link. At each level the IDI is the node being walked from and the ID2 is the node being walked to. The original node appears as a level 0 entry in ID2.

For example, using the Sample_Input_Fileinternal AF Relationship_SPC specification file in the SALT Examples module for internal linking produces the following results:

| | | |
|---|---|---|
| Result 1 | [2 rows] | Key::salt_test7::bdid::rel::cofein |
| Result 2 | [120 rows} | Key::salt_test7::bdid::rel::assoc |
| Match Sample Records | | |
| Slice Out Candidates | | |
| Specificities | | |
| SPC Shift | | |
| Pre Clusters | | |
| Post Clusters | | |
| Pre Cluster Count | | |
| Post Cluster Count | | |
| Matches Performed | | 305 |
| Basic Matches Performed | | 132 |
| Slices Performed | | 14 |
| Rule Efficacy | [7 rows] | |
| Confidence Levels | [73 rows] | |
| Propagation Assisted Pcnt | | 17.04918032786885 |
| Propagation Required Pcnt | | 5.573770491803279 |
| Pre Pop Stats | [1 rows] | |
| Post Pop Stats | [1 rows] | |
| Validity Statistics | [1 rows] | |
| Id Consistency4 | [1 rows] | |
| Result 22 | [1 rows] | key::salt_test7::bdid::debug::specificities debug |
| Result 23 | [148375 rows] | key::salt_test7::bdid::debug::match candidates debug |
| Result 24 | [152 rows] | key::salt_test7::bdid::datafile::attribute_matches |
| Result 25 | [437 rows] | key::salt_test7::bdid::debug::match_sample_debug |
| Result 26 | [148375 rows] | key::salt_test7::bdid::datafile::patched candidates |
| Result 27 | [151475 rows] | temp::bdid::salt_test7::it1 |
| Result 28 | [6620 rows] | temp::bdid::salt_test7:changes_it1 |

Result 1 is the file produced by the COFEIN relationship. This file contains the following results:

|   | bdid1 | bdid2 | basis score | dedup val | cnt | company name score |
|---|---|---|---|---|---|---|
| 1 | 37178850 | 292680203 | 22 | 54286 | 2 | 11 |
| 2 | 292680203 | 37178850 | 22 | 54286 | 2 | 11 |

Result 2 is the file produced by the top-level relationship called ASSOC. contains the following results:

|    | bdid1 | bdid2 | co-llocate score | co-llocate cnt | co-fein score | co-fein cnt | company name score | total cnt | total score |
|----|---|---|---|---|---|---|---|---|---|
| 1  | 28318440  | 81815873  | 12 | 1 | 0  | 0 | 11 | 1 | 23 |
| 2  | 31178850  | 292680203 | 0  | 0 | 22 | 2 | 11 | 2 | 23 |
| 3  | 41434192  | 42443948  | 13 | 1 | 0  | 0 | 11 | 1 | 24 |
| 4  | 42443948  | 41434192  | 13 | 1 | 0  | 0 | 11 | 1 | 24 |
| 5  | 81815873  | 28318440  | 12 | 1 | 0  | 0 | 11 | 1 | 23 |
| 6  | 82061141  | 286051048 | 9  | 1 | 11 | 0 | 8  | 1 | 28 |
| 7  | 176223914 | 387316952 | 12 | 1 | 0  | 0 | 11 | 1 | 23 |
| 8  | 286051048 | 82061141  | 9  | 1 | 11 | 0 | 8  | 1 | 28 |
| 9  | 292680203 | 37178850  | 0  | 0 | 22 | 2 | 11 | 2 | 33 |
| 10 | 387316952 | 176223914 | 12 | 1 | 0  | 0 | 11 | 1 | 23 |
| 11 | 408311407 | 408973906 | 12 | 1 | 0  | 0 | 11 | 1 | 23 |
| 12 | 408973906 | 408311407 | 12 | 1 | 0  | 0 | 11 | 1 | 23 |
| 13 | 427653229 | 994817609 | 10 | 1 | 11 | 0 | 4  | 1 | 25 |
| 14 | 994817609 | 427653229 | 10 | 1 | 11 | 0 | 4  | 1 | 25 |

We claim:

1. A computer-implemented method for identifying one or more synthetic identities among a population of entity representations in an electronic database, each entity representation comprising a plurality of records, each record comprising a plurality of fields, at least a first field of the plurality of fields capable of indicating a connection to a cohort entity representation in the population, the method performed by at least one processor configured to access the electronic database, the method comprising:

selecting, from the population of entity representations, a first entity representation;

for the selected first entity representation:

identifying one or more network chains formed by one or more connections between the first entity representation, a second entity representation, and zero or more intervening entity representations;

determining a number of connections per connection degree for a predetermined number of degrees in at least one of the identified one or more network chains;

determining, based on the number of connections per connection degree, geometric growth ratios of the one or more connections between the first entity representation, the second entity representation, and the zero or more intervening entity representations, wherein the geometric growth rate r associated with a given connection separation degree d is determined by:

$$r = \left(\frac{x_d}{x_0}\right)^{\frac{1}{d}} - 1,$$

wherein $x_d$ is the number of connections at a given separation degree, and $x_o$ is the initial number of connections;

determining, based on the determined geometric growth ratios below a threshold, an indication that one or more of the first entity representation, the second entity representation, and zero or more of the intervening entity representations is a synthetic identity; and outputting entity representation information of one or more entities in the population that are indicated as a synthetic identity.

2. The method of claim 1, wherein determining the number of connections per connection degree comprises:

determining a shortest network chain of the identified one or more network chains; and determining the number of connections for each connection degree in the shortest network chain.

3. The method of claim 1, wherein determining an indication that one or more of the first entity representation, the second entity representation, and zero or more of the intervening entity representations is a synthetic identity is further based on establishment dates of the one or more connections.

4. The method of claim 1, wherein the one or more connections comprises one or more of relative connections, business associate connections, social network connections, common asset connections, and historical address connections.

5. The method of claim 1, wherein a system graph is utilized to determine the one or more connections, wherein the system graph comprises information associated with one or more public records including one or more of housing records, vehicular records, marriage records, divorce records, hospital records, death records, court records, property records, employment records, business records, address records, tax records, corporate records, incarceration records, and utility records, wherein the utility records comprise one or more of utility hookups, disconnects, and associated service addresses.

6. The method of claim 1, wherein the one or more connections are based at least in part on a distance between geographical regions proximate to a plurality of locations associated with one or more activities common to the entity representations.

7. The method of claim 1, wherein the indication is further based on differences between the determined geometric growth ratios.

8. The method of claim 1, wherein the population of entity representations comprises 10 million or more entities.

9. The method of claim 1, wherein the predetermined number of degrees is five or less.

10. The method of claim 1, wherein r less than 1.5 for degree d greater than 4 indicates a synthetic identity.

11. A system comprising:
at least one memory for storing data and computer-executable instructions; and
at least one processor configured to access the at least one memory and further configured to execute the computer-executable instructions [to] for identifying one or more synthetic identities among a population of entity representations in an electronic database, each entity representation comprising a plurality of records, each record comprising a plurality of fields, at least a first field of the plurality of fields capable of indicating a connection to a cohort entity representation in the population, the one or more synthetic identities are identified by:
selecting, from the population of entity representations, a first entity representation;
for the selected first entity representation:
identifying one or more network chains formed by one or more connections between the first entity representation, a second entity representation, and zero or more intervening entity representations;
determining a number of connections per connection degree for a predetermined number of degrees in at least one of the identified one or more network chains;
determining, based on the number of connections per connection degree, geometric growth ratios of the one or more connections between the first entity representation, the second entity representation, and the zero or more intervening entity representations, wherein the geometric growth rate r associated with a given connection separation degree d is determined by:

$$r = \left(\frac{x_d}{x_0}\right)^{\frac{1}{d}} - 1,$$

wherein $x_d$ is the number of connections at a given separation degree, and $x_o$ is the initial number of connections;
determining, based on the determined geometric growth ratios below a threshold, an indication that one or more of the first entity representation, the second entity representation, and zero or more of the intervening entity representations is a synthetic identity; and
outputting entity representation information of one or more entities in the population that are indicated as a synthetic identity.

12. The system of claim 11, wherein determining the number of connections per connection degree comprises:
determining a shortest network chain of the identified one or more network chains; and
determining the number of connections for each connection degree in the shortest network chain.

13. The system of claim 11, wherein determining an indication that one or more of the first entity representation, the second entity representation, and zero or more of the intervening entity representations is a synthetic identity is further based on establishment dates of the one or more connections.

14. The system of claim 11, wherein the one or more connections comprises one or more of relative connections, business associate connections, social network connections, common asset connections, and historical address connections.

15. The system of claim 11, wherein a system graph is utilized to determine the one or more connections, wherein the system graph comprises information associated with one or more public records including one or more of housing records, vehicular records, marriage records, divorce records, hospital records, death records, court records, property records, employment records, business records, address records, tax records, corporate records, incarceration records, and utility records, wherein the utility records comprise one or more of utility hookups, disconnects, and associated service addresses.

16. The system of claim 11, wherein the one or more connections are based at least in part on a distance between geographical regions proximate to a plurality of locations associated with one or more activities common to the entity representations.

17. The system of claim 1, wherein the indication is further based on differences between the determined geometric growth ratios.

18. The system of claim 11, wherein the population of entity representations comprises 10 million or more entities.

19. The system of claim 11, wherein the predetermined number of degrees is five or less.

20. The system of claim 1, wherein r less than 1.5 for degree d greater than 4 indicates a synthetic identity.

* * * * *